United States Patent [19]

Neri

[11] Patent Number: 4,631,693
[45] Date of Patent: Dec. 23, 1986

[54] SYSTEM FOR MONITORING THE OPERATION OF OUTPUT TRANSDUCERS OF A CENTRAL CONTROL AND MONITORING UNIT FOR MACHINES AND/OR DEVICES USABLE IN PRODUCTION AND/OR PRODUCT PACKAGING LINES

[75] Inventor: Armando Neri, Bologna, Italy

[73] Assignee: G.D. Societa per Azioni, Bologna, Italy

[21] Appl. No.: 566,370

[22] Filed: Dec. 28, 1983

[30] Foreign Application Priority Data

Feb. 15, 1983 [IT] Italy .................................. 3336 A/83

[51] Int. Cl.[4] ...................... G01R 31/34; G05B 9/02; G08B 21/00; G01P 13/00
[52] U.S. Cl. .................................... 364/550; 364/184; 324/51; 340/664; 340/679; 73/DIG. 3
[58] Field of Search ............... 364/550, 579, 483, 551, 364/508, 468, 184, 552, 479, 492, 493, 513; 324/51 R; 73/DIG. 3; 340/664, 658, 654, 679, 540; 310/46, 68; 318/254 A; 123/617

[56] References Cited

U.S. PATENT DOCUMENTS

| | | | |
|---|---|---|---|
| 3,603,948 | 9/1971 | Medlinski | 364/551 X |
| 3,665,399 | 5/1972 | Zehr et al. | 364/551 X |
| 3,793,512 | 2/1974 | Lorenzen | 340/679 X |
| 3,874,391 | 4/1975 | Dogl et al. | 364/468 X |
| 4,165,726 | 8/1979 | Helmer, Jr. | 123/617 X |
| 4,278,921 | 7/1981 | Medding et al. | 318/254 A |
| 4,320,463 | 3/1982 | Himmelstein | 364/552 |
| 4,366,544 | 12/1982 | Shima et al. | 364/508 X |
| 4,381,549 | 4/1983 | Stamp, Jr. et al. | 364/551 X |
| 4,398,242 | 8/1983 | Buus | 364/183 |
| 4,404,640 | 9/1983 | Dumbeck et al. | 364/468 X |
| 4,432,064 | 2/1984 | Barker et al. | 364/550 |
| 4,481,569 | 11/1984 | Hoodbhoy | 364/513 X |
| 4,495,587 | 1/1985 | Plante et al. | 364/552 X |
| 4,503,507 | 3/1985 | Takeda et al. | 364/513 |
| 4,516,214 | 5/1985 | Ray | 364/483 |

FOREIGN PATENT DOCUMENTS 2110386 6/1983 United Kingdom ................ 364/550

OTHER PUBLICATIONS

Dance, Brian "Hall Effect Devices and Their Applications", *Electronics Industry*, May 1979, pp. 22–27.

Primary Examiner—Errol A. Krass
Assistant Examiner—Joseph L. Dixon
Attorney, Agent, or Firm—Frost & Jacobs

[57] ABSTRACT

There is described a system for monitoring the operation of output transducers of a central control and monitoring unit for machines usable in production and/or product packaging lines. The main characteristic of this system lies in the fact that it includes a detector for detecting the passage of current in the transducer without relying on a voltage drop detection system.

8 Claims, 2 Drawing Figures

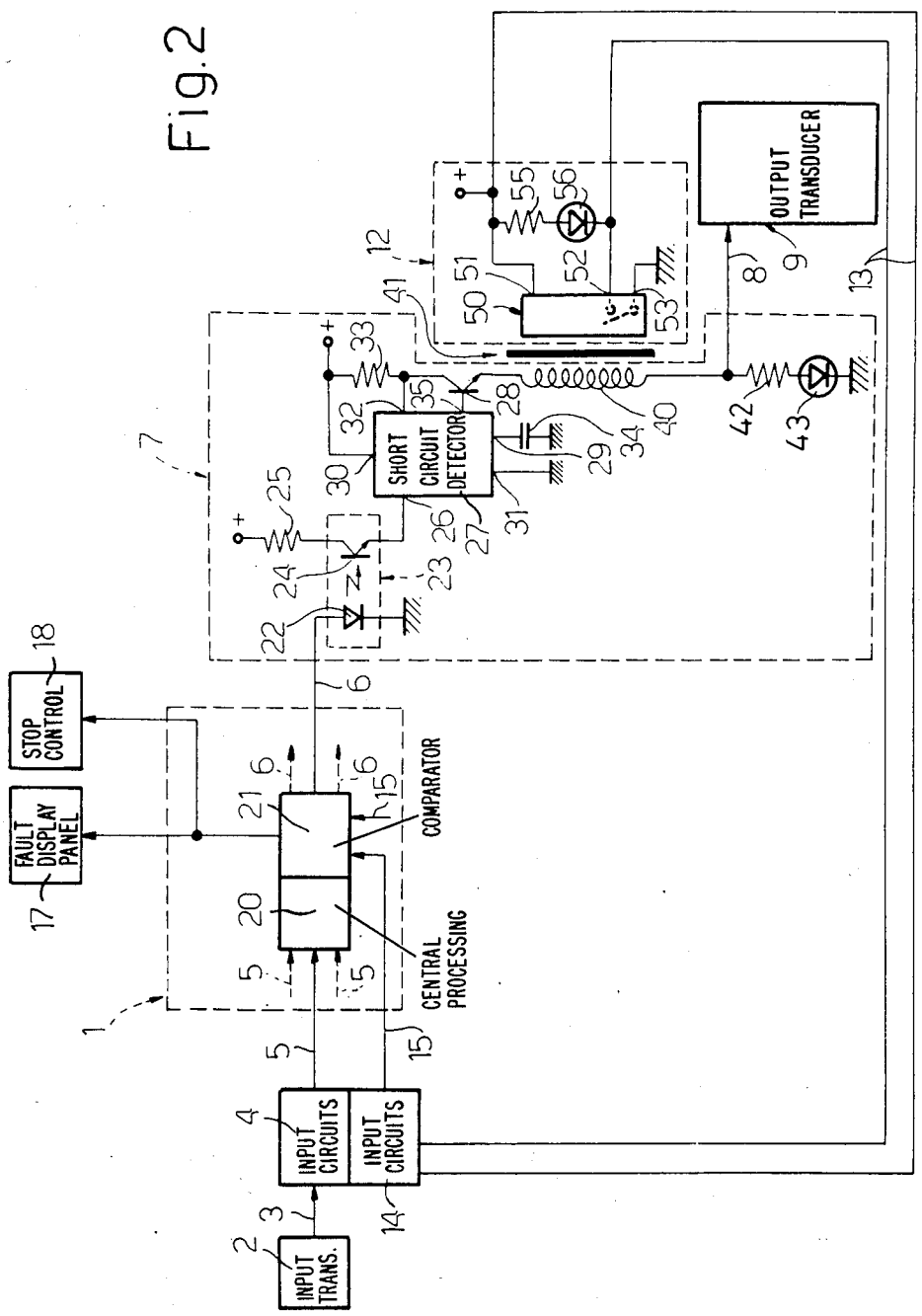

SYSTEM FOR MONITORING THE OPERATION OF OUTPUT TRANSDUCERS OF A CENTRAL CONTROL AND MONITORING UNIT FOR MACHINES AND/OR DEVICES USABLE IN PRODUCTION AND/OR PRODUCT PACKAGING LINES

BACKGROUND OF THE INVENTION

The present invention relates to a system for monitoring the operation of output transducers of a central control and monitoring unit for machines and/or devices usable in production and or product packaging lines, for example, cigarette production lines and/or cigarette packet packaging lines; such lines can, for example, include cigarette making machines, filter fitting machines, packaging machines, cellophane wrapping machines, carton making and parcel forming machines.

As is known, such individual machines or production lines are controlled by a central control and monitoring unit, which in dependence on certain signals emitted by input transducers, determine, at suitable instants, the operations of the various output transducers which can also belong to different machines in the same line.

Signals from such input transducers arrive at the central control and monitoring unit via associated input circuits. Further, the central control and monitoring unit also effects the detection of the effect of the controls on the output transducers, via associated monitoring circuits which detect a voltage drop caused by the signal directed to the output transducer.

Such monitoring circuits are coupled to the central unit by means of associated input circuits. Upon detection of a defect in the transfer of control signals to the output transducers, the central unit activates a fault indicator and stops the machine.

SUMMARY OF THE INVENTION

The object of the present invention is that of improving the system of monitoring the action of the output transducers for machines and/or devices of the type specified above, in such a way as to obviate the disadvantages inherent in voltage drop detection systems, and further to provide a much more precise and detailed breakdown indication.

According to the present invention, there is provided a system for monitoring the operation of output transducers of a central control and monitoring unit for machines and/or devices usable in production and/or product packaging lines, characterized by the fact that it includes means for detecting the passage of current in the transducer.

BRIEF DESCRIPTION OF THE DRAWINGS

For a better understanding of a the present invention an embodiment will now be described, by way of non-limitative example, with reference to the attached drawings, in which:

FIG. 2 is an electrical and block diagram of some component parts of the operation monitoring system of FIG. 1.

DETAILED DESCRIPTION OF THE INVENTION

Figure 1:
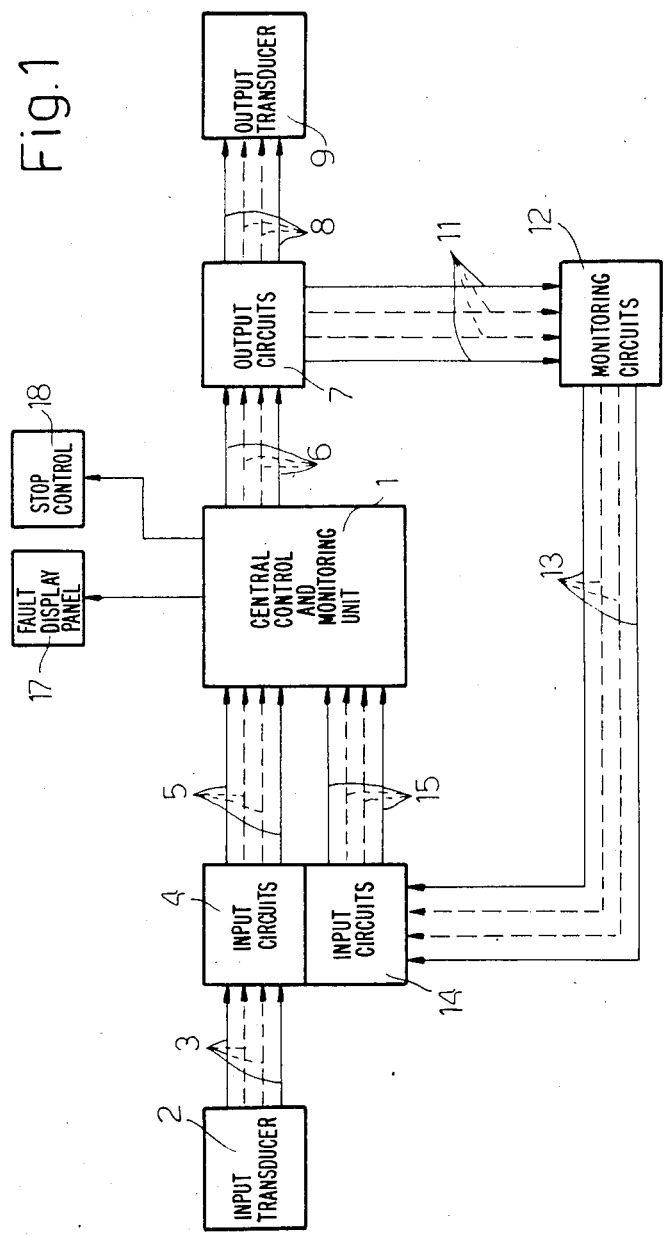
FIG. 1 is a block diagram of the output transducer operation monitoring system according to the present invention.

With reference to FIG. 1, a central control and monitoring unit for machines and/or devices usable in production and/or product packaging lines, in particular production and packaging of packets of cigarettes, is generally indicated by reference numeral 1.

As has already been indicated above, in a known configuration these lines include a plurality of input transducers 2 which are coupled by associated connections 3 to respective input circuits 4 which are connected via respective connections 5 to the central unit 1. This unit 1 is in turn connected by respective connections 6 to respective output circuits 7 which are connected via respective connections 8 to respective output transducers 9. The output circuits 7 are then respectively connected, via connections or couplings 11, to respective monitoring circuits 12 which are connected, via respective connections 13 to respective input circuits 14 connected via respective connections 15 to the central unit 1.

To this central unit 1 are then connected a fault display panel 17 and a block 18 for controlling the stopping of the machine or the line.

Each input transducer 2 is therefore connected, via a connection 3, to a respective input circuit 4 which is connected via a connection 5 to the unit 1. These input circuits 4 are therefore equal in number to the number of input transducers 2. Similarly, there are a corresponding number of output circuits 7 as there are output transducers 9, and an equal number both of the monitoring circuits 12 and the input circuits 14 and connections 15 between the unit 1 and the input circuits 14. As is illustrated in detail in FIG. 2, the various connections 5 from the various input circuits 4 are connected to a central processor 20 of the unit 1 which sends a control signal to a respective output connections 6 via a control circuit 21. The connection 6, in the output circuit 7, is connected to the anode of a photo-diode 22, the cathode of which is grounded. This photo-diode 22 belongs to a photo-electric coupling device 23 which includes a photo-transistor 24, the collector of which is connected via a resistor 25 to a positive voltage supply terminal, whilst the emitter is connected to an input 26 of a circuit 27 which provides protection against possible short circuits for an output transistor 28. Circuit 27 has a port 30 which is connected to a positive voltage supply terminal, a port 31 which is grounded, a port 32 connected to one end of a resistor 33, the other end of resistor 33 is connected to the positive supply terminal, and a port 29 which is grounded through a capacitor 34. The port 32 is further connected to the collector of the transistor 28, the base of which is connected to another output port 35 from the circuit 27.

The emitter of the transistor 28 is connected to one end of a winding 40 of a coupling transformer 41 providing the coupling 11, the other end of which is connected to the connection 8, leading to the output transducer 9 and is grounded via a series connected resistor 42 and a photo-diode 43, with the cathode connected to the ground and conveniently emitting a red light. The output transducer 9 can be a relay, a remote control switch or a lamp, for example, in which case the output circuit 7 can be a board, for example, constituted by a heavier load, an electromagnet or a clutch, in which case the output circuit 7 is a convenient output module.

Via the transformer 41, the winding 40 is coupled to a Hall effect switching device 50 belonging to the monitoring circuit 12. In particular, this device 50 has a first port 51 connected to a positive supply voltage terminal, and two ports 52 and 53, the second of which is grounded, between which is established a connection in the presence of a magnetic field generated by the current which flows through the winding 40. Between the ports 51 and 52 there is arranged, in series, a resistor 55 and a photo-diode 56 having its cathode connected to the port 52 and conveniently emitting a green light. The positive voltage supply port and the port 52 are then connected to the connections 13 leading to the input circuit 14.

The operation of the output transducer operation monitoring system formed according to the present invention is as follows.

After the central unit 1, following a signal from the connection 5, has sent a suitable signal on the connection 6 towards a respective output circuit 7 the transistor 28 is activated to control the supply via the connection 8 to the output transducer 9. Through the coupling transformer 41, the closure of the switch between the ports 52 and 53 occurs so that a signal for the input circuit 14 is generated, which, via the connection 15, determines the comparison signal for the central circuit 21 which therefore allows normal operation of the unit 1.

In the event of a breakdown in the control for the output transducers 9, the current in the winding 40 is lost so that the connection between the ports 52 and 53 remains open and therefore the comparison signal in the connection 15 to the control circuit 21 is lost. This activates a fault indication on the panel 17 illustrating which of the various output circuits 7 of the machine or the line failed, and activates stop control 18 which stops the machine.

On the basis of the indication on the panel 17, the operator can observe the output circuit 7, the monitoring circuit 12 and the state of the photo-diodes 43 and 56. In fact, in the event of a breakdown in the connection 8 leading to the output transducer 9, the substantial output current in the winding 40 is lost so that the photo-diode 56 will be extinguished whilst the photo-diode 43 will be illuminated. On the other hand, in the case of failure in the output circuit 7, so that even the minimum output current in the transistor 28 is lost, both the photo-diodes 43 and 56 will be in an extinguished state. In this way, the operator can immediately determine if the fault is in the output circuits 7 or in the connection 8 leading to the output transducer 9, which can be a significant distance from the output circuit 7.

In the event of correct operation, however, both the photo-diodes 42 and 56 are illuminated. Further, in the event of a short circuit of the output of the transistor 28, the voltage across the terminals of the resistor 33 increases, which is detected by the short circuit protector 27. The protector 27 causes the transistor 28 to switch off for a time period predetermined by the capacitor 34. At the end of the time constant determined by the capacitor 34, the transistor 28 is activated again and in the event of a continued short circuit condition, the transistor 28 is again switched off as described above.

There are various advantages obtained with the system for monitoring the operation of output transducers 9, formed according to the present invention; first of all, the monitoring circuit 12 acts to monitor the current rather than the voltage to detect if the output transducer 9 is working or not, via the coupling formed with the transformer 41, thereby avoiding voltage drops in the connection to the transducer 9 itself; further, by means of the photo-diodes 42 and 56 there is obtained a selective indication of the zone of the possible fault thereby simplifying maintenance.

Finally, it is clear that the described embodiment of the monitoring system for output transducers of the present invention can be modified and varied without departing from the scope of the invention itself.

What is claimed:

1. A monitoring system for a machine used in a production line, said system comprising a central control unit; an output circuit connected to said central control unit; an output transducer connected to said output circuit; a monitoring circuit means associated with said output circuit for detecting the passage of current in said output transducer, said monitoring circuit means generating a comparison signal, there being no direct electrical connection between said monitoring circuit means and said output circuit; said central control unit including a control circuit which emits a control signal for said output transducer and receives the comparison signal from said monitoring circuit means; a stop control means to stop the machine; a first luminous indicator; said control circuit including means to emit a signal to said stop control means to stop the machine and send a signal to said first luminous indicator, whereby in the event of loss of said comparison signal said means to emit a stop signal is activated to stop the machinery.

2. A system according to claim 1, wherein said monitoring circuit means includes a Hall effect switching device.

3. A system according to claim 1, further comprising a means for detecting and indicating possible operational faults in said output circuit and in the connection to the output transducer.

4. A system according to claim 3, wherein said means for detecting and indicating possible operational faults includes a selective luminous indicator.

5. A system according to claim 3, wherein said output circuit includes input and output ends, said input end is connected to said central control unit and said output end is connected to said output transducer; said means for detecting and indicating possible operational faults is connected to said output end of said output circuit and includes a second luminous indicator; and said means for detecting and indicating possible operational faults also includes a third luminous indicator activated by said monitoring circuit means to indicate passage of current to said output transducer.

6. A system according to claim 5, wherein said second and third luminous indicators are of different colors.

7. A system according to claim 1, wherein said input end of said output circuit is a photo-electric coupling means.

8. A system according to claim 1, wherein said output circuit includes short circuit means to detect a short circuit condition in the power leading to the transducer and to switch off, for a predetermined time period, the power leading to the transducer.

* * * * *